US006778728B2

United States Patent
Taylor et al.

(10) Patent No.: US 6,778,728 B2
(45) Date of Patent: Aug. 17, 2004

(54) MICRO-ELECTRO-MECHANICAL MIRROR DEVICES HAVING A HIGH LINEAR MIRROR FILL FACTOR

(75) Inventors: William Patrick Taylor, North Andover, MA (US); Edwin Thomas Carlen, Cambridge, MA (US); Carlos Horacio Mastrangelo, Andover, MA (US); Jonathan Jay Bernstein, Medfield, MA (US)

(73) Assignee: Corning Intellisense Corporation, Wilmington, MA (US)

( * ) Notice: Subject to any disclaimer, the term of this patent is extended or adjusted under 35 U.S.C. 154(b) by 281 days.

(21) Appl. No.: 10/085,963

(22) Filed: Feb. 28, 2002

(65) Prior Publication Data

US 2003/0031403 A1 Feb. 13, 2003

Related U.S. Application Data

(60) Provisional application No. 60/311,657, filed on Aug. 10, 2001.

(51) Int. Cl.[7] .................................................. G02B 6/35
(52) U.S. Cl. .............................. 385/18; 385/16; 385/17; 359/224; 359/877
(58) Field of Search ...................... 385/16–24; 359/223, 359/224, 872, 876, 877

(56) References Cited

U.S. PATENT DOCUMENTS

| 5,126,812 A | 6/1992 | Greiff |
| 5,136,671 A | 8/1992 | Dragone |
| 5,175,777 A | 12/1992 | Bottle |
| 5,600,479 A | 2/1997 | Evans |
| 5,631,782 A | 5/1997 | Smith et al. |
| 6,061,369 A | 5/2000 | Conradi |
| 6,097,859 A | 8/2000 | Solgaard et al. |
| 6,107,115 A | 8/2000 | Atobe et al. |
| 6,253,001 B1 | 6/2001 | Hoen |
| 6,256,430 B1 | 7/2001 | Jin et al. |
| 6,681,063 B1 * | 1/2004 | Kane et al. .................... 385/18 |

FOREIGN PATENT DOCUMENTS

| EP | 0 663 770 A1 | 7/1995 |
| EP | 0 712 022 A2 | 5/1996 |
| WO | WO 01/18595 A1 | 3/2001 |
| WO | WO 01/55769 A1 | 8/2001 |

* cited by examiner

Primary Examiner—Phan T. H. Palmer
(74) Attorney, Agent, or Firm—Wilmer Cutler Pickering Hale and Dorr LLP (57) ABSTRACT

An array of movable MEMS mirror devices is provided having a high linear mirror fill factor. The array includes a base structure and selectively movable mirror structures pivotally mounted on the base structure. Each mirror structure is pivotally supported by a flexure connected to the base structure. The mirror structures each include a reflective surface portion, which is arranged in close proximity to the reflective surface portions of other mirror structures and in a generally linear alignment, forming a row structure. The flexures supporting adjacent mirror structures are staggered on opposite sides of the row structure.

134 Claims, 5 Drawing Sheets

MICRO-ELECTRO-MECHANICAL MIRROR DEVICES HAVING A HIGH LINEAR MIRROR FILL FACTOR

RELATED APPLICATION

The present application is based on and claims priority from U.S. provisional patent application serial No. 60/311,657 filed on Aug. 10, 2001 and entitled HIGH FILL FACTOR MEMS MIRRORS.

FIELD OF THE INVENTION

The present invention relates generally to microelectromechanical (MEMS) devices and, more particularly, to MEMS devices having movable mirrors used, e.g., in optical switches, scanners and projectors.

BACKGROUND OF THE INVENTION

Optical switches are used for routing optical signals in fiber optic networks. The switches selectively transmit light signals from a set of input fibers to a set of output fibers. The switches typically include at least one array of movable mirrors or reflectors that can be selectively actuated to deflect light signals to particular output fibers. The movable mirrors can be actuated or controlled in a variety of ways including through electromagnetic actuation, electrostatic actuation, piezoelectric actuation, thermal bimorph and comb-drive actuation. Fabrication of the mirror arrays has been attempted using MEMS technology, in which silicon processing and related techniques common to the semiconductor industry are used to form micro-electromechanical devices.

BRIEF SUMMARY OF EMBODIMENTS OF THE INVENTION

Arrays of movable MEMS mirror devices are provided having a high linear mirror fill factor. In accordance with some embodiments, the arrays include a base structure and a plurality of selectively movable mirror structures pivotally mounted on the base structure. Each mirror structure is pivotally supported by a flexure connected to the base structure. The mirror structures each include a reflective surface portion, which is arranged in close proximity to the reflective surface portions of other mirror structures and in a generally linear alignment, forming a row structure. The flexures supporting adjacent mirror structures are staggered on opposite sides of the row structure. The array can have a linear mirror fill factor greater than about 70%.

These and other features of the invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

Figure 1:
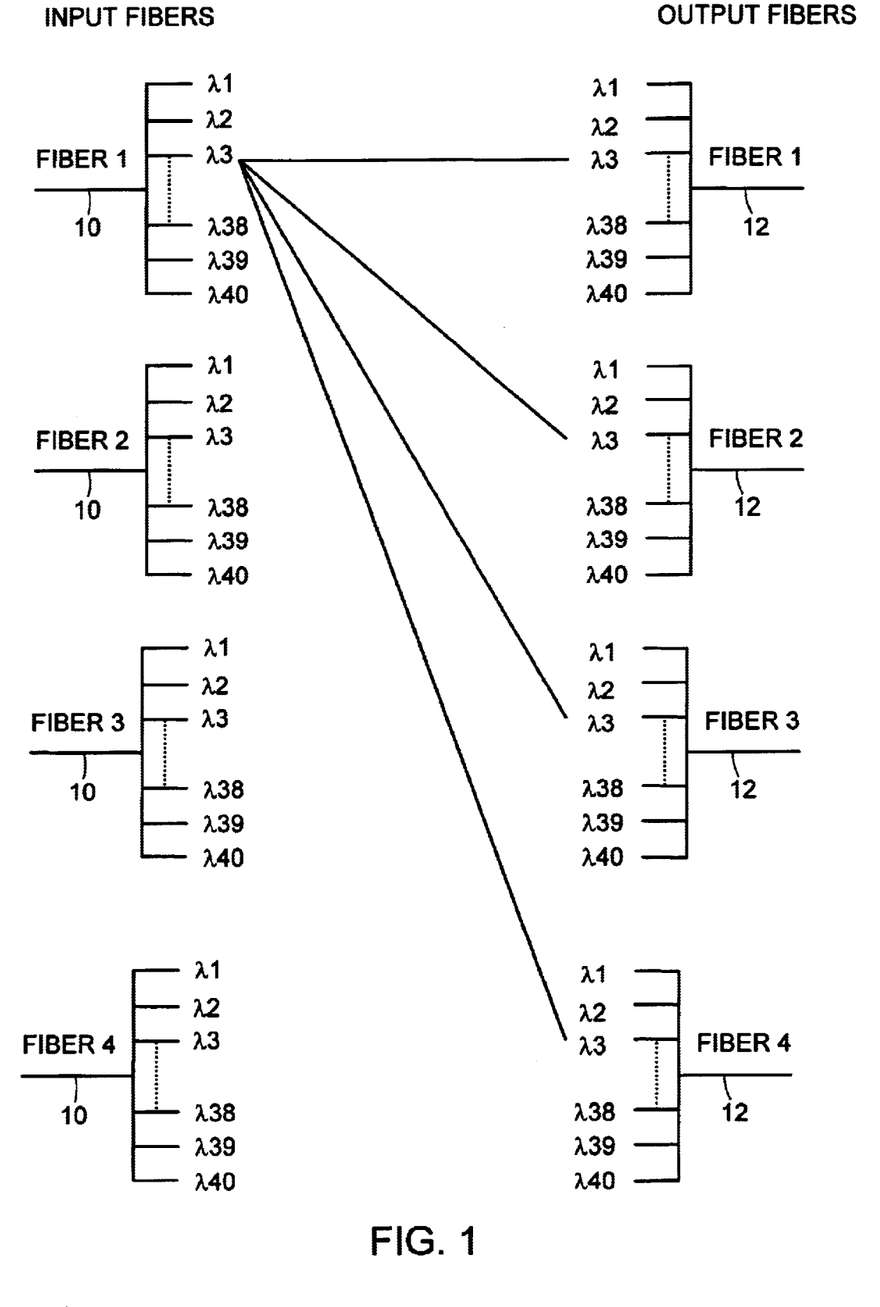
FIG. 1 is a schematic diagram illustrating the operation of a wavelength selective switch.

FIG. 1 schematically illustrates the operation of a particular type of optical switch known as a wavelength selective cross connect switch, which can be used to switch optical signals between multiple input fibers or channels 10 and output fibers or channels 12. In particular, the switch allows a signal of any wavelength on any fiber to be switched to any output fiber. For example, in the 4×4 wavelength cross connect switch shown in FIG. 1, each input wavelength (indicated by $\lambda 1$ to $\lambda 40$) can be switched to any one of four possible output fibers. In this illustration, there are 40 wavelengths per fiber or a total of 160 possible wavelength inputs. Other numbers of wavelengths per fiber are also possible such as, e.g., 80 or more wavelengths per fiber.

Figure 2:
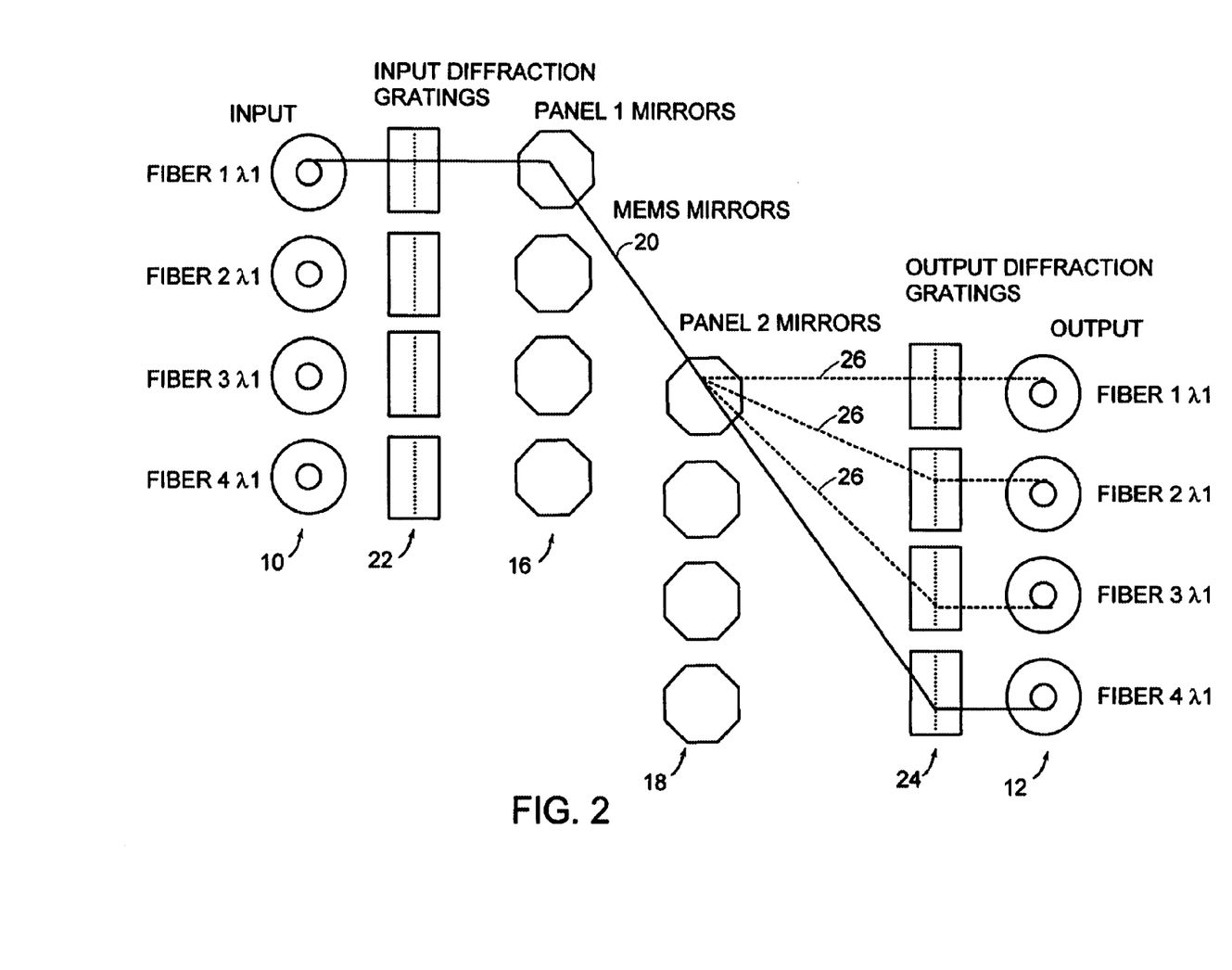
FIG. 2 is a schematic diagram illustrating operation of the FIG. 1 switch in greater detail.

The 4×4 MEMS wavelength selective switch can use movable MEMS mirrors to selectively deflect signals between fibers. The mirrors are typically rotatable about a single axis, although rotation about two axes is also possible. Two MEMS mirror arrays 16, 18 are used as shown in FIG. 2, which schematically illustrates an example of how MEMS mirror arrays are used in the switch. For ease of illustration, the figure only shows the path of one of the optical wavelengths (indicated by solid line 20). In this illustration, the mirrors are only rotatable about a single axis. As shown, an input wavelength ($\lambda 1$) from fiber 1 is passed through an input diffraction grating 22 and onto the first mirror of the first mirror array 16, which directs the beam to the first mirror of a second set of mirrors 18. The mirror of the second set of mirrors 18 selectively directs the light to an output diffraction grating or lens 24, which combines signals of various wavelengths into the corresponding output fiber 12. The dashed lines 26 indicate other possible paths of the signal from the second set of mirrors 18.

Wavelength selective switches can also include only a single set of MEMS mirrors for deflecting light from input to output fibers. This is particularly suitable for a 1×N or N×1 type switch.

Figure 3:
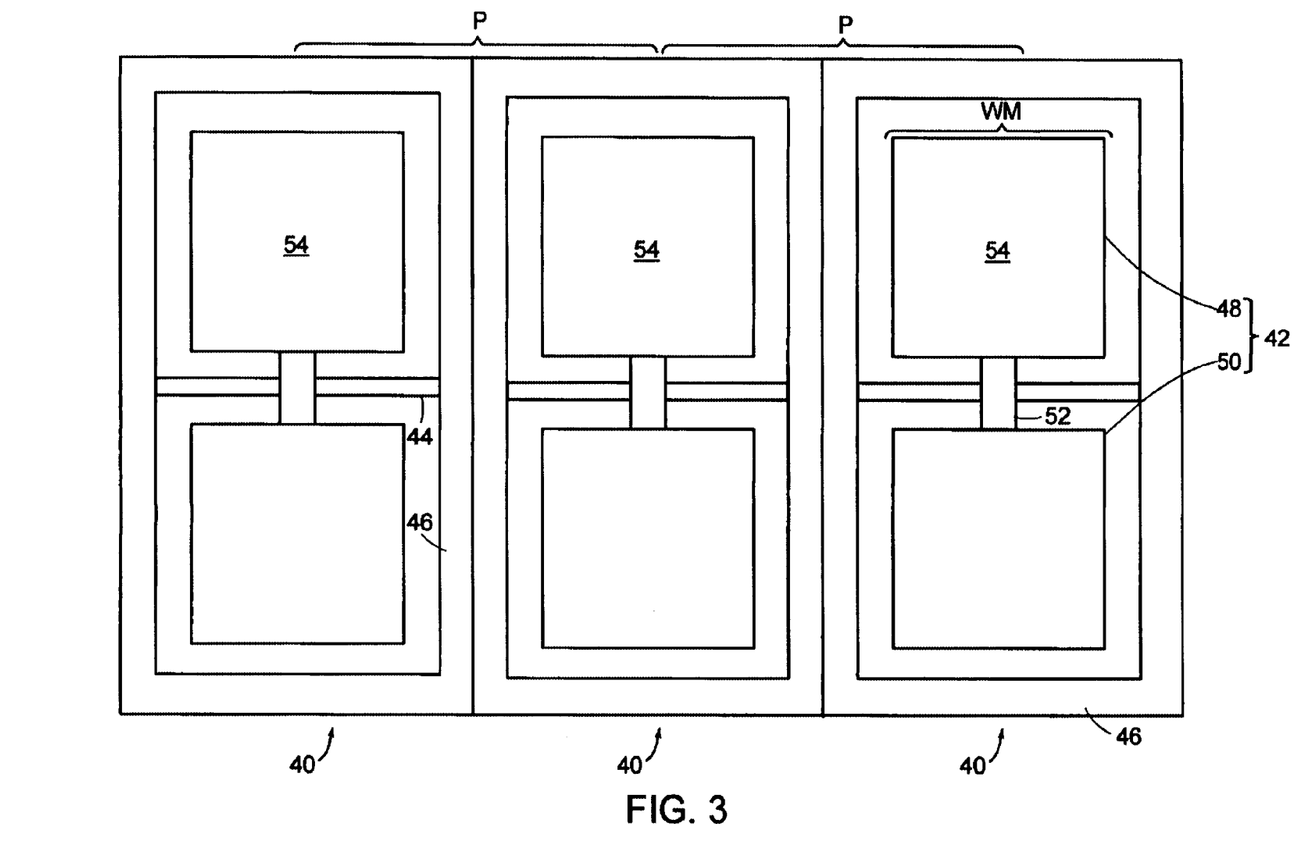
FIG. 3 is a schematic plan view diagram of a mirror array not optimized for linear mirror fill factor.

It is desirable to have MEMS mirror arrays with a high linear mirror fill factor to increase the mirror surface coverage of the arrays and thereby reduce optical loss and improve performance. FIG. 3 shows an example of a mirror array that is not optimized for linear mirror fill factor. The array of FIG. 3 includes three selectively movable mirror devices 40 or "pixels". Each pixel includes a mirror structure 42 pivotally mounted on a flexure 44 connected to a base or support frame structure 46. Each mirror structure 42 includes first and second enlarged portions 48, 50 connected by a narrowed neck member 52. The neck member 52 is mounted on the flexure 44. The first enlarged portion 48 of the mirror structure includes a reflective mirror surface 54 for use in deflecting optical signals. The second enlarged portion 50 of the mirror structure typically includes an actuation device (such as, e.g., an electromagnetic actuation coil) for causing selective pivoting of the mirror structure about the flexure. A portion of the mechanical support frame 46 is located between adjacent mirror structures 42. This support frame is needed to support the flexures 44 and enable the mirror structures 42 to move independently of each other. The presence of the support structure 46, however, reduces the linear mirror fill factor of the array, which can be defined by the width of each mirror (indicated by WM) relative to the pixel pitch, which is the repeating distance between adjacent pixels (indicated by P).

The present invention is directed to MEMS mirror arrays having high linear mirror fill factors. Such arrays are useful for devices as shown in FIGS. 1 and 2. The linear mirror fill factor of the mirror array shown in FIG. 3 can be improved as discussed below.

Figure 4:
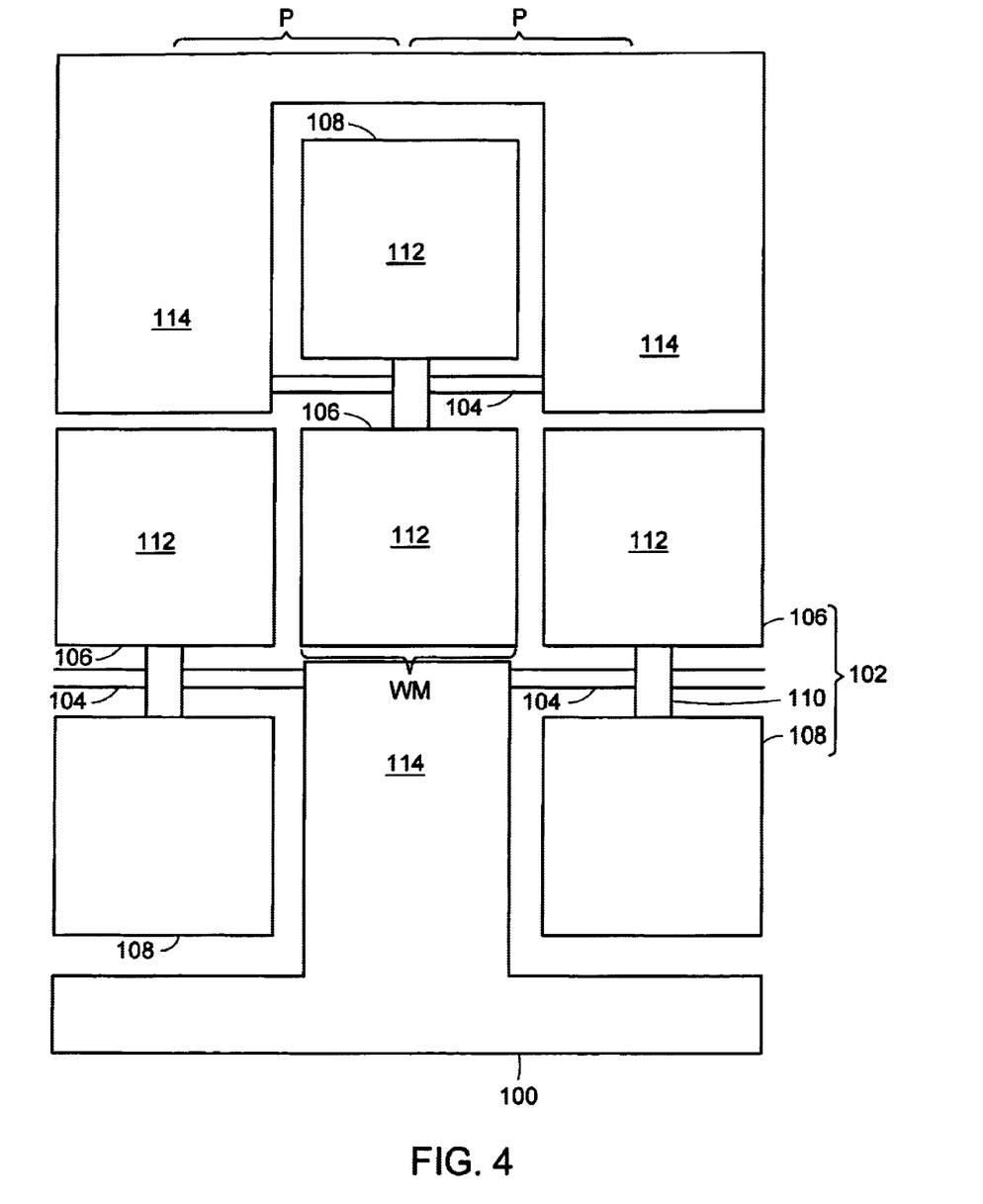
FIG. 4 is a schematic plan view diagram of a mirror array in accordance with one embodiment of the invention.

An example of a MEMS mirror array in accordance with a preferred embodiment of the invention is shown in FIG. 4. The array includes a base support structure 100 and a plurality of selectively movable mirror structures 102 pivotally mounted on the base structure 100. Each mirror structure 102 is pivotally supported by a flexure 104 connected to the base structure 100. The mirror structures 102 each include two enlarged portions 106, 108 separated by a neck member 110. One enlarged portion 106 includes an exposed reflective surface portion 112, which is arranged in close proximity to the reflective surface portions 112 of other mirror structures 102 in a generally linear alignment, forming a row structure. The other enlarged portion 108 of each mirror structure 102 can include an actuation mechanism (such as, e.g., an actuation coil for electromagnetically actuated devices) for causing desired selective movement of the mirror structure about the flexure.

Alternatively, both enlarged portions 106 and 108 can have actuation coils. The enlarged portion 106 includes an exposed reflective surface, which either covers or is adjacent to the coil on the enlarged portion 106.

As shown, mirror structures 102 are offset from one another in one of the two dimensions of the surface of the substrate on or in which the devices are built. The flexures 104 supporting adjacent mirror structures 102 are accordingly staggered on opposite sides of the row structure. As shown, the flexures can be buried in, i.e., extend into, the neck portion 110 of the mirror structure.

The base support structure 100 includes fingers or peninsulas or support members 114 of bulk substrate material extending to the flexures 104. The base support structure 100 preferably has the thickness of the wafer from which it is fabricated, and accordingly it is generally sufficiently thick so as to not act as a sensitive accelerometer.

The mirror structures 102 can also have other possible shapes. For example, the mirror structures can have a generally constant width (i.e., without any narrowed neck portion). With such a mirror structure, the fingers 114 of the base structure 100 can be narrowed to allow for increased flexure length if needed.

The spacing between the reflective surface portions or mirrors 112 in the FIG. 4 array can be made very small. In the non-optimized device of FIG. 3, the spacing between adjacent mirrors is about 190 microns for 400 microns wide mirrors. The pixel pitch ("P" defined as the repeating distance of the pixel) is accordingly 590 microns, which results in a linear fill factor of approximately 67% for the pixel. By contrast, for pixels in the FIG. 4 array, the spacing between adjacent mirrors 112 can be as little as between 5 to 40 microns (or less) with the same mirror width (WM) of 400 microns. For an example 20 micron spacing, this results in the pixel pitch being 420 microns, with a linear fill factor of approximately 95%. Other spacings are also possible such that the linear fill factor is at least about 70%. The fill factor is preferably greater than 80%, and even more preferably greater than 90%.

Advantages of an increased linear mirror fill factor include greater mirror surface coverage and reduced optical loss in the same linear space. Switch performance is thereby improved.

Figure 5:
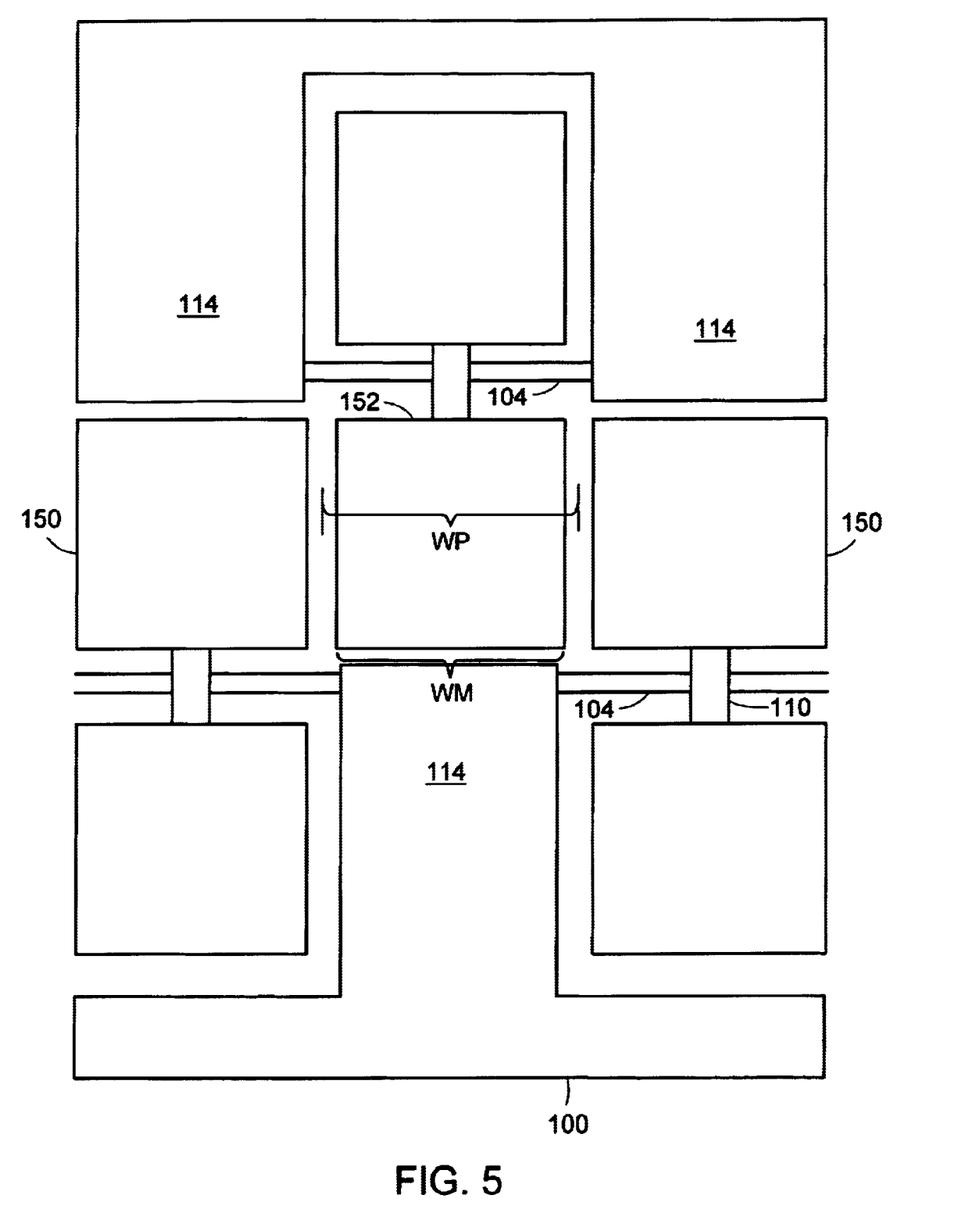
FIG. 5 is a schematic plan view diagram of a mirror array in accordance with another embodiment of the invention.

FIG. 5 illustrates a mirror array in accordance with another embodiment of the invention. The FIG. 5 array includes differently sized mirrors. For example, the mirror array can include mirror structures 150, 152 having different widths. For such a mirror array, a linear mirror fill factor value can be determined for each pixel. This value is defined by WM/WP, where WM is the mirror width and WP is the pixel width (or mirror width plus half the spacing on each side to adjacent mirrors). For each pixel in the array, the mirror fill factor can be greater than about 70%. The fill factor is preferably greater than about 80%, and more preferably greater than about 90%.

Mirror arrays in accordance with the invention may be used with a variety of mirror actuation mechanisms including, e.g., electromagnetic, electrostatic, thermal, piezoelectric, and other forms of mirror actuation.

High fill factor mirror arrays in accordance with the invention can be used in a switching device having any number of optical fibers. Also, the number of input and output fibers can be different, i.e., the number of input fibers can be greater than or less than the number of output fibers. In addition, use of a single mirror array or multiple mirror arrays is possible.

A variety of different flexures can be used for pivotally supporting mirror structures in the arrays. For example, use of folded flexures is possible. Additionally, the flexures may have various cross-sectional shapes including, e.g., a generally non-rectangular cross-sectional shape such as a generally "U" or "V" cross-sectional shapes.

In addition, the flexures can be thinned or sized appropriately to allow at least a small movement of the mirror orthogonal to the main axis of rotation. Accompanying actuators can be implemented to provide motion control on both axes. Such actuators can include, e.g., split electrode electrostatic actuators.

High linear fill factor mirror arrays in accordance with the invention can be used in a variety of devices including optical switching devices (such as, e.g., wavelength selective switches), scanning devices and projectors. In addition, high linear fill factor arrays of other MEMS actuators are also possible.

Having described various preferred embodiments of the present invention, it should be apparent that modifications can be made without departing from the spirit and scope of the invention.

What is claimed is:

1. An array of movable MEMS mirror devices having a high linear mirror fill factor, comprising:

a base structure; and a plurality of selectively movable mirror structures, each being pivotally supported by a flexure connected to said base structure, and each mirror structure having a reflective surface portion,     the reflective surface portions of the mirror structures being arranged in close proximity to each other and in generally linear alignment forming a row structure, with the flexures supporting adjacent mirror structures being staggered on opposite sides of said row structure.

2. The array of claim 1 wherein said array has a linear mirror fill factor of at least about 70%.

3. The array of claim 1 wherein said array has a linear mirror fill factor of at least about 80%.

4. The array of claim 1 wherein said array has a linear mirror fill factor of at least about 90%.

5. The array of claim 1 wherein each mirror structure is part of a pixel, and each pixel has a linear mirror fill factor of at least about 70%.

6. The array of claim 1 wherein each mirror structure is part of a pixel, and each pixel has a linear mirror fill factor of at least about 80%.

7. The array of claim 1 wherein each mirror structure is part of a pixel, and each pixel has a linear mirror fill factor of at least about 90%.

8. The array of claim 1 wherein spacing between adjacent reflective surface portions of said mirror structures is about 20 microns.

9. The array of claim 1 wherein spacing between adjacent reflective surface portions of said mirror structures is about up to 40 microns.

10. The array of claim 1 wherein spacing between adjacent reflective surface portions of said mirror structures is about 5 to 10 microns.

11. The array of claim 1 wherein spacing between adjacent reflective surface portions of said mirror structures is less than about 5 microns.

12. The array of claim 1 wherein each mirror structure comprises two enlarged portions connected by a neck member, wherein one of said two enlarged portions includes said reflective surface portion, and wherein said flexure is connected to said neck member.

13. The array of claim 1 wherein portions of said base structure are positioned on opposite sides of said row structure for supporting said flexures, wherein no portion of said base structure extends between the reflective surface portions of adjacent mirror structures.

14. The array of claim 1 wherein at least two of said mirror structures have different widths.

15. The array of claim 1 wherein said flexures are folded.

16. The array of claim 1 wherein said flexures have a generally non-rectangular cross-sectional shape.

17. The array of claim 1 wherein said flexures have a generally U or V cross-sectional shape.

18. An optical switch having movable MEMS mirror devices with a high linear mirror fill factor, comprising:
   a base structure;
   a first mirror structure having a reflective surface portion, said first mirror structure pivotally supported by a first flexure connected to said base structure;
   a second mirror structure having a reflective surface portion, said second mirror structure pivotally supported by a second flexure connected to said base structure;
   the reflective surface portions of the first and second mirror structures being positioned in close proximity to each other, and said first and second flexures being on opposite sides of said reflective surface portions and generally in a plane of said reflective surface portions or a plane parallel thereto; and
   means for selectively moving said first and second mirror structures about said first and second flexures, respectively.

19. The optical switch of claim 18 wherein said base structure includes a portion for supporting said first flexure and a portion for supporting the second flexure, and wherein said portions of said base structure are on opposite sides of an area in which said reflective surface portions of said mirror structures are located.

20. The optical switch of claim 19 wherein no portion of said base structure extends between said reflective surface portions of said mirror structures.

21. The optical switch of claim 18 wherein said array has a linear mirror fill factor of at least about 70%.

22. The optical switch of claim 18 wherein said array has a linear mirror fill factor of at least about 80%.

23. The optical switch of claim 18 wherein said array has a linear mirror fill factor of at least about 90%.

24. The optical switch of claim 18 wherein each mirror structure is part of a pixel, and each pixel has a linear mirror fill factor of at least about 70%.

25. The optical switch of claim 18 wherein each mirror structure is part of a pixel, and each pixel has a linear mirror fill factor of at least about 80%.

26. The optical switch of claim 18 wherein each mirror structure is part of a pixel, and each pixel has a linear mirror fill factor of at least about 90%.

27. The optical switch of claim 18 wherein spacing between adjacent reflective surface portions of said mirror structures is about 20 microns.

28. The optical switch of claim 18 wherein spacing between adjacent reflective surface portions of said mirror structures is about up to 40 microns.

29. The optical switch of claim 18 wherein spacing between adjacent reflective surface portions of said mirror structures is about 5 to 10 microns.

30. The optical switch of claim 18 wherein spacing between adjacent reflective surface portions of said mirror structures is less than about 5 microns.

31. The optical switch of claim 18 wherein each mirror structure comprises two enlarged portions connected by a neck member, wherein one of said two enlarged portions includes said reflective surface portion, and wherein said flexure is connected to said neck member.

32. The optical switch of claim 18 wherein said mirror structures have different widths.

33. The optical switch of claim 18 wherein said flexures are folded.

34. The optical switch of claim 18 wherein said flexures have a generally non-rectangular cross-sectional shape.

35. The optical switch of claim 18 wherein said flexures have a generally U or V cross-sectional shape.

36. An array of MEMS mirror devices having a high linear mirror fill factor, comprising:
   a base structure; and
   a plurality of selectively movable mirror structures each comprising a first portion having a reflective surface thereon and a second portion having an actuation coil thereon, each mirror structure being pivotally supported by a flexure positioned between said first and second portions, said flexure being connected to said base portion;
   wherein the first portions of said mirror structures are generally linearly aligned forming a row structure and arranged in close proximity, and wherein the second portions and flexures for adjacent mirror structures are staggered on alternating sides of said row structure.

37. The array of claim 36 wherein said array has a linear mirror fill factor of at least about 70%.

38. The array of claim 36 wherein said array has a linear mirror fill factor of at least about 80%.

39. The array of claim 36 wherein said array has a linear mirror fill factor of at least about 90%.

40. The array of claim 36 wherein each mirror structure is part of a pixel, and each pixel has a linear mirror fill factor of at least about 70%.

41. The array of claim 36 wherein each mirror structure is part of a pixel, and each pixel has a linear mirror fill factor of at least about 80%.

42. The array of claim 36 wherein each mirror structure is part of a pixel, and each pixel has a linear mirror fill factor of at least about 90%.

43. The array of claim 36 wherein spacing between adjacent first portions of said mirror structures is about 20 microns.

44. The array of claim 36 wherein spacing between adjacent first portions of said mirror structures is about up to 40 microns.

45. The array of claim 36 wherein spacing between adjacent first portions of said mirror structures is about 5 to 10 microns.

46. The array of claim 36 wherein spacing between adjacent first portions of said mirror structures is less than about 5 microns.

47. The array of claim 36 wherein for each mirror structure, said first and second portions are enlarged and connected by a neck member, and wherein said flexure is connected to said neck member.

48. The array of claim 36 wherein said base structure comprises support members on opposite sides of said row structure for supporting said flexures, wherein said support members do not extend between adjacent first portions of said mirror structures.

49. The array of claim 36 wherein at least two of said mirror structures have different widths.

50. The array of claim 36 wherein said flexures are folded.

51. The array of claim 36 wherein said flexures have a generally non-rectangular cross-sectional shape.

52. The array of claim 36 wherein said flexures have a generally U or V cross-sectional shape.

53. An array of movable MEMS mirror devices comprising:
   a base structure; and
   a plurality of selectively movable mirror structures, each being pivotally supported by a flexure connected to said base structure, and each having a reflective surface portion, wherein said reflective surface portions are generally linearly aligned and arranged in close proximity with a linear mirror fill factor of at least about 70%.

54. The array of claim 53 wherein the linear fill factor is at least about 80%.

55. The array of claim 53 wherein the linear fill factor is at least about 90%.

56. The array of claim 53 wherein spacing between adjacent reflective surface portions of said mirror structures is about 20 microns.

57. The array of claim 53 wherein spacing between adjacent reflective surface portions of said mirror structures is about up to 40 microns.

58. The array of claim 53 wherein spacing between adjacent reflective surface portions of said mirror structures is about 5 to 10 microns.

59. The array of claim 53 wherein spacing between adjacent reflective surface portions of said mirror structures is less than about 5 microns.

60. The array of claim 53 wherein each mirror structure comprises first and second enlarged portions connected by a neck member, wherein first enlarged portions has said reflective surface portion, and said flexure is connected to said neck member.

61. The array of claim 53 wherein said base structure comprises support members on opposite sides of said linearly aligned reflective surface portions for supporting said flexures, wherein no portion of said support members extends between said reflective surface portions of said mirror structures.

62. The array of claim 53 wherein at least two of said mirror structures have different widths.

63. The array of claim 53 wherein said flexures are folded.

64. The array of claim 53 wherein said flexures have a generally non-rectangular cross-sectional shape.

65. The array of claim 53 wherein said flexures have a generally U or V cross-sectional shape.

66. An array of movable MEMS mirror devices, comprising:
   a base structure;
   a plurality of selectively movable mirror structures, each including a reflective surface portion; and
   means for pivotally supporting said mirror structures such that the reflective surface portions of the mirror structures are generally linearly aligned and positioned in sufficiently close proximity such that the array has a linear mirror fill factor of at least about 70%.

67. The array of claim 66 wherein the linear mirror fill factor is at least about 80%.

68. The array of claim 66 wherein the linear mirror fill factor is at least about 90%.

69. The array of claim 66 wherein spacing between adjacent reflective surface portions of said mirror structures is about 20 microns.

70. The array of claim 66 wherein spacing between adjacent reflective surface portions of said mirror structures is about up to 40 microns.

71. The array of claim 66 wherein spacing between adjacent reflective surface portions of said mirror structures is about 5 to 10 microns.

72. The array of claim 66 wherein spacing between adjacent reflective surface portions of said mirror structures is less than about 5.

73. The array of claim 66 wherein each mirror structure comprises two enlarged portions connected by a neck member, wherein one of said two enlarged portions includes said reflective surface portion.

74. The array of claim 66 wherein at least two of said mirror structures have different widths.

75. The array of claim 66 wherein said mirror structures are supported on folded flexures.

76. The array of claim 66 wherein said mirror structures are supported on flexures having a generally non-rectangular cross-sectional shape.

77. The array of claim 66 wherein said mirror structures are supported on flexures having a generally U or V cross-sectional shape.

78. A method of selectively switching optical signals between input and output optical fibers, comprising:
   providing an optical switch having an array of selectively movable MEMS mirror devices, each having a reflective surface portion, the reflective surface portions of the mirror devices being generally linearly aligned and arranged in close proximity to each other such that the array has a linear mirror fill factor of at least about 70%; and
   selectively actuating mirror devices to deflect optical signals from input fibers to desired output fibers.

79. The method of claim 78 wherein the linear mirror fill factor is at least about 80%.

80. The method of claim 78 wherein the linear mirror fill factor is at least about 90%.

81. The method of claim 78 wherein said mirror devices are pivotally mounted on flexures, and wherein selectively actuating mirror devices comprises selectively tilting the mirror devices about the flexures.

82. An array of movable MEMS devices having a high linear mirror fill factor, comprising:
    a base structure; and
    a plurality of selectively movable structures, each being pivotally supported by a flexure connected to said base structure, and each structure having an exposed surface portion,
    the exposed surface portions of the structures being arranged in close proximity to each other and in generally linear alignment forming a row structure, with the flexures supporting adjacent structures being staggered on opposite sides of said row structure.

83. The array of claim 82 wherein said array has a linear exposed surface fill factor of at least about 70%.

84. The array of claim 82 wherein said array has a linear exposed surface fill factor of at least about 80%.

85. The array of claim 82 wherein said array has a linear exposed surface fill factor of at least about 90%.

86. The array of claim 82 wherein each movable structure is part of a pixel, and each pixel has a linear exposed surface fill factor of at least about 70%.

87. The array of claim 82 wherein each movable structure is part of a pixel, and each pixel has a linear exposed surface fill factor of at least about 80%.

88. The array of claim 82 wherein each movable structure is part of a pixel, and each pixel has a linear exposed surface fill factor of at least about 90%.

89. The array of claim 82 wherein spacing between adjacent exposed surface portions of said structures is about 20 microns.

90. The array of claim 82 wherein spacing between adjacent exposed surface portions of said structures is about up to 40 microns.

91. The array of claim 82 wherein spacing between adjacent exposed surface portions of said structures is about 5 to 10 microns.

92. The array of claim 82 wherein spacing between adjacent exposed surface portions of said structures is less than about 5 microns.

93. The array of claim 82 wherein each structure comprises two enlarged portions connected by a neck member, wherein one of said two enlarged portions includes said exposed surface portion, and wherein said flexure is connected to said neck member.

94. The array of claim 82 wherein portions of said base structure are positioned on opposite sides of said row structure for supporting said flexures, wherein no portion of said base structure extends between the exposed surface portions of adjacent structures.

95. The array of claim 82 wherein at least two of said structures have different widths.

96. The array of claim 82 wherein said flexures are folded.

97. The array of claim 82 wherein said flexures have a generally non-rectangular cross-sectional shape.

98. The array of claim 82 wherein said flexures have a generally U or cross-sectional shape.

99. The array of claim 82 wherein said exposed surface portions comprise reflective surface portions.

100. An array of movable MEMS mirror devices having a high linear mirror fill factor, comprising a plurality of selectively movable mirror structures, each mirror structure being pivotally supported by a flexure and having a reflective surface portion, the reflective surface portions of the mirror structures being arranged in close proximity to each other and in generally linear alignment forming a row structure, with the flexures supporting adjacent mirror structures being staggered on opposite sides of said row structure.

101. The array of claim 100 wherein said array has a linear mirror fill factor of at least about 70%.

102. The array of claim 100 wherein said array has a linear mirror fill factor of at least about 80%.

103. The array of claim 100 wherein said array has a linear mirror fill factor of at least about 90%.

104. The array of claim 100 wherein each mirror structure is part of a pixel, and each pixel has a linear mirror fill factor of at least about 70%.

105. The array of claim 100 wherein each mirror structure is part of a pixel, and each pixel has a linear mirror fill factor of at least about 80%.

106. The array of claim 100 wherein each mirror structure is part of a pixel, and each pixel has a linear mirror fill factor of at least about 90%.

107. The array of claim 100 wherein spacing between adjacent reflective surface portions of said mirror structures is about 20 microns.

108. The array of claim 100 wherein spacing between adjacent reflective surface portions of said mirror structures is about up to 40 microns.

109. The array of claim 100 wherein spacing between adjacent reflective surface portions of said mirror structures is about 5 to 10 microns.

110. The array of claim 100 wherein spacing between adjacent reflective surface portions of said mirror structures is less than about 5 microns.

111. The array of claim 100 wherein each mirror structure comprises two enlarged portions connected by a neck member, wherein one of said two enlarged portions includes said reflective surface portion, and wherein said flexure is connected to said neck member.

112. The array of claim 100 wherein said flexures are connected to a base structure, and wherein portions of said base structure are positioned on opposite sides of said row structure for supporting said flexures, wherein no portion of said base structure extends between the reflective surface portions of adjacent mirror structures.

113. The array of claim 100 wherein at least two of said mirror structures have different widths.

114. The array of claim 100 wherein said flexures are folded.

115. The array of claim 100 wherein said flexures have a generally non-rectangular cross-sectional shape.

116. The array of claim 100 wherein said flexures have a generally U or V cross-sectional shape.

117. A method of selectively switching optical signals between input and output optical fibers, comprising:
    providing an optical switch having an array of selectively movable MEMS mirror devices comprising a base structure and a plurality of selectively movable mirror structures, each mirror structure being pivotally supported by a flexure connected to said base structure, and each mirror structure having a reflective surface portion, the reflective surface portions of the mirror structures being arranged in close proximity to each other and in generally linear alignment forming a row structure, with the flexures supporting adjacent mirror structures being staggered on opposite sides of said row structure; and
    selectively actuating mirror devices to deflect optical signals from input fibers to desired output fibers.

118. The method of claim 117 wherein said array has a linear mirror fill factor of at least about 70%.

119. The method of claim 117 wherein said array has a linear mirror fill factor of at least about 80%.

120. The method of claim 117 wherein said array has a linear mirror fill factor of at least about 90%.

121. The method of claim 117 wherein each mirror structure is part of a pixel, and each pixel has a linear mirror fill factor of at least about 70%.

122. The method of claim 117 wherein each mirror structure is part of a pixel, and each pixel has a linear mirror fill factor of at least about 80%.

123. The method of claim 117 wherein each mirror structure is part of a pixel, and each pixel has a linear mirror fill factor of at least about 90%.

124. The method of claim 117 wherein spacing between adjacent reflective surface portions of said mirror structures is about 20 microns.

125. The method of claim 117 wherein spacing between adjacent reflective surface portions of said mirror structures is about up to 40 microns.

126. The method of claim 117 wherein spacing between adjacent reflective surface portions of said mirror structures is about 5 to 10 microns.

127. The method of claim 117 wherein spacing between adjacent reflective surface portions of said mirror structures is less than about 5 microns.

128. The method of claim 117 wherein each mirror structure comprises two enlarged portions connected by a neck member, wherein one of said two enlarged portions includes said reflective surface portion, and wherein said flexure is connected to said neck member.

129. The method of claim 117 wherein portions of said base structure are positioned on opposite sides of said row structure for supporting said flexures, wherein no portion of said base structure extends between the reflective surface portions of adjacent mirror structures.

130. The method of claim 117 wherein at least two of said mirror structures have different widths.

131. The method of claim 117 wherein said flexures are folded.

132. The method of claim 117 wherein said flexures have a generally non-rectangular cross-sectional shape.

133. The method of claim 117 wherein said flexures have a generally U or V cross-sectional shape.

134. The method of claim 117 wherein selectively actuating mirror devices comprises selectively tilting mirror structures about respective flexures.

* * * * *